Patented Dec. 27, 1949

2,492,760

UNITED STATES PATENT OFFICE 2,492,760

DECORATIVE PROTECTIVE COATING COMPOSITION

Clyde G. Murphy, Raritan Township, Middlesex County, N. J., and John P. Sermattei, Wilmington, Del., assignors to E. I. du Pont de Nemours & Company, Wilmington, Del., a corporation of Delaware No Drawing. Application August 13, 1947, Serial No. 768,502

7 Claims. (Cl. 260—27)

1

This invention relates to a decorative protective coating composition and more particularly to a decorative protective coating composition for use on flexible sheet materials such as paper of the grade used for labels, magazine covers, book covers, etc.

The application of coatings to both plain and printed papers and to similar fibrous sheet materials for the purpose of decoration and protection has been practiced for many years. Coatings used for this purpose have included spirit varnishes, oil base varnishes, alkyd and phenolic resin varnishes, lacquers containing depolymerized and chlorinated rubber and lacquers based on certain cellulose esters and ethers such as nitrocellulose and ethyl cellulose. Another method of obtaining high gloss decorative and protective finishes for plain and printed paper and similar fibrous materials has been the practice of laminating cellulose acetate film or regenerated cellulose film to such bases. The first type, while definitely enhancing the appearance of the paper by providing a glossy finish to it and also providing a certain degree of protection, is poorer in gloss and not as durable and tough as the composite sheet obtained by laminating cellulose acetate film or regenerated cellulose film to the base sheet.

This invention has an object the provision of a new type decorative and protective coating. A further object is the provision of such a coating composition for use on flexible sheet materials such as plain and printed paper and similar fibrous materials. A still further object of this invention is the provision of a coating which, with a dry film thickness of less than 0.5 mil, has an improved glossy finish approaching that of cellulose acetate or regenerated cellulose laminated composite sheets. A still further object of this invention is the provision of a coating which when applied to paper, not only enhances the appearance of the paper and provides protection for it, but is also non-tacky, non-smearing, and non-blocking. Other objects will appear hereinafter.

These objects are accomplished by coating paper, cardboard and the like with certain hard brittle resins which are plasticized with a specific rubbery type synthetic resin dissolved in suitable solvents such as toluene and xylene. The product is a coating having exceptionally high gloss approaching that of laminated cellulose acetate film and is far superior to similar coatings based on conventional lacquers or varnishes.

The coatings of this invention are prepared by dissolving the ingredients in a suitable aromatic

2 solvent such as toluene or xylene in conventional lacquer mixing equipment. The specific resinous plasticizer is the rubbery copolymer resulting from the copolymerization of ethylene and vinyl acetate. The particular copolymer of ethylene and vinyl acetate that we prefer to use is one containing 3 mols of ethylene to 1 mol of vinyl acetate. However, copolymers containing ratios of ethylene to vinyl acetate ranging from 1 to 10 mols ethylene to 1 mol vinyl acetate can be used. The preferred copolymers fall in the range 2 to 4 mols ethylene to 1 mol vinyl acetate. As the ethylene to vinyl acetate ratio goes above 8 to 1, the solubility at ordinary temperatures decreases and mild heating up to about 60° C. is necessary to effect complete solution. At ratios below 1 mol ethylene to 1 mol vinyl acetate, unsatisfactory solubility is obtained.

Copolymers of ethylene and vinyl acetate that have been partially hydrolyzed after polymerization are likewise satisfactory. However, in the case of these hydrolyzed copolymers, some alcohol is required in the solvent mixture with the toluene or xylene in order to effect complete solution. The preferred hydrolyzed polymer is one containing a mol ratio of 2.6 mols ethylene to 1 mol vinyl acetate and hydrolyzed to the extent of about 15% calculated as polyvinyl alcohol. However, other copolymers in the range 2 to 4 mols ethylene to 1 mol vinyl acetate and hydrolyzed up to about 25% polyvinyl alcohol can be used.

The viscosities of these ethylene-vinyl acetate copolymers may vary, but the preferred resin gives a viscosity of 20 centipoises at 25° C. in a 10% solution in toluene. However, higher or lower viscosity resins can be used.

So far as we have been able to determine, these ethylene-vinyl acetate copolymers, together with the products resulting from their partial hydrolysis, are unique in the properties they impart to the compositions of this invention, and we have not found any other resinous or rubbery materials which produce equivalent results.

These copolymers may be prepared in the following manner:

In a stainless steel shaker tube are charged 125 parts of vinyl acetate monomer, and 0.2 parts of benzoyl peroxide. The tube is closed, flushed with oxygen free nitrogen, evacuated, and then pressured with ethylene to about 500 atmospheres. The tube and contents are then heated to 70° C. and held at this temperature for about 9 hours. Under these conditions, the pressure of the tube is in the range of 850–1000 atmospheres and is held within this range by repressuring with ethylene as needed. Upon working up the contents of the tube at the end of the reaction period, about 80 parts of polymer is obtained. This copolymer will have a composition corresponding to about 3 mols of ethylene to 1 mol of vinyl acetate. In practical operations it is desirable in many cases to introduce water in substantial amounts along with the vinyl acetate.

The preparation of ethylene-vinyl acetate copolymers may also be followed as described in U. S. Patent 2,200,429 and also in applications of Hanford and Roland S. N. 446,115, filed June 6, 1942, and now U. S. Patent 2,336,566, and Hanford and Roland, S. N. 453,036, filed July 31, 1942 and now abandoned.

In order to illustrate the preparation of partially hydrolyzed ethylene-vinyl acetate copolymers, we give the following directions for preparing a 13.5% and a 23% hydrolyzed ethylene-vinyl acetate copolymer with an ethylene to vinyl acetate molal ratio of 2.6 to 1.

*13.5% hydrolyzed ethylene-vinyl acetate copolymer*

160 grams of ethylene-vinyl acetate copolymer (mol ratio 2.6 to 1) were dissolved in 1200 cc. of benzene in a 3 liter, three-necked flask and 700 cc. of isopropyl alcohol (99%) added. The mixture was refluxed and a solution of 7.9 g. of KOH in 100 cc. of isopropyl alcohol added all at once. The mixture was heated and mechanically stirred for two hours and then allowed to cool somewhat. The organic solvents were removed by steam. When the polymer had cooled, it was washed by kneading with water and then further washed and dried on a rubber mill. The product had an amber appearance, and gave the following analytical figures: saponification number 316.5; rel. visc.=1.685 (½% in metacresol at 25° C.).

*23% hydrolyzed ethylene-vinyl acetate copolymer*

This preparation was carried out similarly except that the quantities used were 40 g. ethylene-vinyl acetate copolymer in 300 cc. benzene and a solution of 2.2 g. NaOH in 5 cc. water added to 200 cc. isopropyl alcohol. The product had rel. visc.=1.442 (½% in xylene at 25° C.); saponification number 288.6.

A hard brittle resin is also essential in the invention. Among those which have been found to be the most satisfactory are: (1) coumarone indene resins having a melting point of about 150° C., (2) phenol-formaldehyde modified rosin having a melting point of 150–180° C., and (3) pentaerythritol modified rosin having a melting point of 105–110° C. Other hard brittle resins such as ester gum, natural damar resin, maleic anhydride modified rosin, and terpene resins are also operative in this invention, but the previously described three resins are preferred.

The hard, brittle resins we prefer to use are those which have melting points above 100° C. and are resistant to oxidation. It is necessary that these resins be soluble in aromatic hydrocarbons and be compatible with the ethylene-vinyl acetate copolymers. It is preferable that these resins be light colored, free from odor and taste and non-toxic. In order to achieve the best combination of gloss with film hardness and flexibility, it is preferable to use the hardest, highest melting resins which will tolerate the largest amount of the ethylene-vinyl acetate copolymer without giving a soft, tacky film. These hard brittle resins may be used singly or in various combinations to give the best balance of properties. In those cases where the hard, brittle resin is subject to oxidation, it may be desirable to introduce a small amount of anti-oxidant (about 0.5% based on the resin) to improve the aging properties of the coating.

The ratio of ethylene-vinyl acetate copolymer to hard resin which we prefer to use is 10 parts of ethylene-vinyl acetate copolymer to 90 parts of hard resin, but 5–25 parts of ethylene-vinyl acetate copolymer of 75–95 parts of hard resin are operative. Higher percentages of ethylene-vinyl acetate copolymer tend to impair the blocking resistance of the coated sheets, while lower percentages yield a finish with inferior mar resistance.

In order to describe this invention more fully, several illustrative examples are given without limiting the invention thereto:

*Example I*

| | Per cent |
|---|---|
| Ethylene-vinyl acetate copolymer (3:1) | 5.1 |
| Coumarone indene resin M. P. 150° C. | 51.3 |
| Toluene | 38.4 |
| Xylene | 5.2 |

These ingredients were mixed together until a smooth solution was obtained. The order of mixing is not critical, but it is preferable first to dissolve the ethylene-vinyl acetate copolymer which requires vigorous agitation and then add the other ingredients and continue stirring until complete solution is achieved. This solution was knife coated on overprint label stock at room temperature to give a coating weight of 2 pounds of solids per 1000 square feet on one side. The coating was dried for one minute at a temperature of 95° C. Drying occurred entirely by solvent evaporation. The coated paper had excellent gloss approaching the gloss of laminated cellulose acetate and was non-tacky and free from odor. The coated paper also showed no blocking or marring either coated to coated side or coated to uncoated side when stacks of the coated paper were subjected to a pressure of 0.3 pound per square inch at a temperature of 120° F. for a period of 24 hours.

*Example II*

| | Per cent |
|---|---|
| Ethylene-vinyl acetate copolymer (3:1) | 5.1 |
| Phenol-formaldehyde modified rosin, M. P. 150–160° C. | 51.3 |
| Toluene | 38.4 |
| Xylene | 5.2 |

This composition when applied to overprint label stock in the same manner described for the composition disclosed in Example I, gave a coated paper with physical properties very similar to the paper coated with the composition disclosed in Example I.

*Example III*

| | Per cent |
|---|---|
| Ethylene-vinyl acetate copolymer (3:1) | 3.6 |
| Pentaerythritol modified rosin, M. P. 105–110° C. | 52.8 |
| Toluene | 38.4 |
| Xylene | 5.2 |

This composition when applied to overprint label stock in the same manner described for the composition disclosed in Example I, gave a coated paper with physical properties very similar to the paper coated with the composition disclosed in Example I.

Example IV

| | Per cent |
|---|---|
| Ethylene-vinyl acetate copolymer (3:1) | 6.7 |
| Phenol-formaldehyde modified rosin, M. P. 172–180° C. | 49.1 |
| Toluene | 39.0 |

This composition when applied to overprint label stock in the same manner as described for the composition disclosed in Example I, gave a coated paper with physical properties very similar to the paper coated with the composition disclosed in Example I.

Example V

| | Per cent |
|---|---|
| Ethylene-vinyl acetate copolymer (2.6:1), 15% hydrolyzed | 6.7 |
| Phenol-formaldehyde modified rosin, M. P. 172–180° C | 49.1 |
| Toluene | 27.9 |
| Xylene | 5.2 |
| Alcohol | 11.1 |

This composition when applied to overprint label stock in the same manner as described for the composition of Example I, gave a coated paper with physical properties substantially the same as the paper coated with the composition of Example I.

While it is preferable for most purposes to apply these coatings as solutions in organic solvents, it will be apparent to those skilled in the art that with some modifications in the proportions of the solid ingredients and perhaps the introduction of wax fluxing agents, these compositions can be applied in the molten state as hot melts. In this case the solvent and the drying operation are eliminated.

In order to obtain special color effects, it may be desirable to add small quantities of various dyes. In addition in some cases, the use of minor amounts of waxes, metallic stearates, and mineral oils and the like may be desirable as anti-blocking agents or as slip agents to reduce the tendency of some compositions to stick together when sheets of coated paper are stacked under pressure under unusually high temperatude conditions.

These coating compositions when applied to plain or printed paper or other similar fibrous sheet materials produce a highly glossy decorative and protective surface to the sheet and can be used as a means of greatly enhancing the appearance of labels, book covers, magazine covers, etc. In addition the gloss obtained with the above-disclosed compositions with a film thickness less than 0.5 mil very closely approaches that of laminated cellophane or cellulose acetate with 0.9–1.0 mil for the minimum thickness. Furthermore a lamination operation and the use of a laminating adhesive are eliminated.

These compositions develop their excellent gloss simply by applying them to paper and evaporating the solvents. However, a slight further enhancement in gloss results from fusing or melting the dried coating so as to smooth out slight surface irregularities and thereby produce a more mirror like finish. This fusing or melting of the dried coating can be accomplished by subjecting the coated paper to the radiation from infra-red lamps or from electrically heated coils.

The amount of coating that need be applied to the paper varies depending on the degree of gloss required as well as other considerations, for example, the smoothness and porosity of the paper. Normally the amount of lacquer applied to the paper may vary from about 3 pounds of non-volatile material per 3000 square feet up to about 10 pounds per 3000 square feet. If less than 3 pounds is applied, the degree of gloss will be impaired. On the other hand if more than 10 pounds of coating is applied, the coat is increased without a corresponding increase in gloss. For some purposes, however, this higher amount may be applied satisfactorily.

It is apparent that many widely different embodiments of this invention may be made without departing from the spirit and scope thereof, and therefore, it is not intended to be limited except as indicated in the appended claims.

We claim:

1. A composition for imparting a high gloss to paper which comprises a hard aromatic hydrocarbon soluble resin, having a melting point above 100° C. and a compatible copolymer of 1 to 10 mols of ethylene and one mol of vinyl acetate, the said copolymer being present in amount from 5% to 25% and the hard resin being present in amount from 75% to 95% of the composition.

2. The composition of claim 1 in which the copolymer is hydrolyzed up to 15%.

3. The composition of claim 1 in which the copolymer contains from 2 to 4 mols of ethylene to 1 mol of vinyl acetate and is hydrolyzed up to 25%.

4. The composition of claim 1 in which the copolymer contains from 2 to 4 mols of ethylene to 1 mol of vinyl acetate.

5. The composition of claim 1 which consists of 10 parts of the copolymer and 90 parts of the hard resin.

6. A paper base having a coating of the composition of claim 1.

7. A paper base having a coating of from 3 to 10 pounds per 3000 square feet of the composition of claim 3.

CLYDE G. MURPHY.
JOHN P. SERMATTEI.

REFERENCES CITED

The following references are of record in the file of this patent:

UNITED STATES PATENTS

| Number | Name | Date |
|---|---|---|
| 2,436,080 | Smith | Feb. 17, 1948 |

Certificate of Correction

Patent No. 2,492,760　　　　　　　　　　　　　　December 27, 1949

CLYDE G. MURPHY ET AL.

It is hereby certified that errors appear in the printed specification of the above numbered patent requiring correction as follows:

Column 3, line 12, for the serial number "446,115" read *446,116*; line 13, strike out the words "and now U. S. Patent 2,336,566" and insert instead *now abandoned*; column 5, line 9, in the table, after "Toluene _____39.0" insert *Xylene_____5.2*; column 6, line 19, for "coat" read *cost*;

and that the said Letters Patent should be read with these corrections therein that the same may conform to the record of the case in the Patent Office.

Signed and sealed this 16th day of May, A. D. 1950.

[SEAL]

THOMAS F. MURPHY,
　　　　　　　　　　　　　　　　　　　*Assistant Commissioner of Patents.*